United States Patent [19]

Grienberger et al.

[11] Patent Number: 5,464,542
[45] Date of Patent: Nov. 7, 1995

[54] METHOD AND DEVICE FOR FILTERING AND BACKWASHING SOLID PARTICLES OUT OF LIQUIDS

[75] Inventors: Johann Grienberger, Lauf; Rudolf Bogner, Neumarkt; Christian Frommann, Deining, all of Germany

[73] Assignee: Hans Huber GmbH Maschinen-und Anlagenbau, Berching, Germany

[21] Appl. No.: 340,257

[22] Filed: Nov. 16, 1994

[30]  Foreign Application Priority Data

Nov. 18, 1993 [DE] Germany .............. 43 39 268.7

[51] Int. Cl.⁶ .................................................. B01D 33/06
[52] U.S. Cl. ................... 210/784; 210/791; 210/393; 210/402; 210/406; 210/411
[58] Field of Search ......................... 210/791, 784, 210/333.01, 391, 393, 402, 407, 408, 409, 411, 412, 406

[56]  References Cited

U.S. PATENT DOCUMENTS

| | | | |
|---|---|---|---|
| 3,244,281 | 4/1966 | Kurz et al. | 210/402 |
| 3,347,379 | 10/1967 | Miller | 210/402 |
| 4,090,965 | 5/1978 | Fuchs | 210/402 |
| 4,450,080 | 5/1984 | Dodd | 210/402 |
| 4,655,937 | 4/1987 | Hendrix | 210/391 |
| 4,702,847 | 10/1987 | Fux et al. | 210/411 |
| 4,898,671 | 2/1990 | Fux et al. | 210/411 |
| 5,139,670 | 8/1992 | Hirs | 210/394 |
| 5,213,685 | 5/1993 | Padovan | 210/402 |
| 5,268,095 | 12/1993 | Barzuza | 210/411 |

FOREIGN PATENT DOCUMENTS

| | | |
|---|---|---|
| 0074966 | 5/1985 | European Pat. Off. |
| 2505565 | 2/1975 | Germany . |
| 553588 | 12/1971 | Switzerland . |

*Primary Examiner*—Robert A. Dawson
*Assistant Examiner*—Robert James Popovics
*Attorney, Agent, or Firm*—Hopkins & Thomas

[57]  ABSTRACT

A method for filtering and backwashing solid particles out of liquids is illustrated, with a filter drum (5) positioned completely below the liquid level (6) having a cylindrical surface (7) coated with a filter medium (8), the liquid flown through the outside of the filter drum to the inside. A backwashing device for removal of the filter cake from the filter medium is provided. At the beginning of each cycle of backwashing an air cushion (15) is introduced in the filter drum (5) and liquid in the filter drum (5) is displaced in such a manner so that liquid jets from an ejetion apparatus (19) containing a spraying head (17) and being arranged in the interior of the filter drum without being sealed on the filter drum penetrate through the air cushion (15) to the backside of the cylindrical surface (7) of the filter drum (5). The filter cake so removed from the filter drum is withrawn at the outside of filter drum (5) in a stream of liquid.

10 Claims, 4 Drawing Sheets

METHOD AND DEVICE FOR FILTERING AND BACKWASHING SOLID PARTICLES OUT OF LIQUIDS

FIELD OF INVENTION

This invention relates to a method and a device for filtering and backwashing solid particles out of liquids, with a filter drum positioned completely below the liquid level having a cylindrical surface coated with a filter medium, the liquid flowing through the outside of the filter drum to the inside, and a backwashing device for the removal of the filter cake collacted on the filter medium. This device is used in sewage treatment plants, for example in hydraulically overloaded plants, in which particles of activated sludge within a sedimentation tank do not settle completely and are withdrawn out of the tank.

BACKGROUND OF THE INVENTION

A method and a device of the detailed manner are described in CH 553 588. There a filter drum already positioned completely below the liquid level is used, the cylindrical surface of which is coated with a filter medium, the liquid being passed through the filter drum from the outside to the inside. The whole circumference of the cylindrical surface is used for filtering purpose. A backwashing device is provided for the removal of the filter cake from the filter medium, the divice containing a suction head in shape of a suction bar located in the lower region of the filter drum on the outside, making it possible to withdraw the filter cake in intervals. It is a disadvantage that the cleaning effect of the filter medium is limited by the performance of the pump of the suction device. Due to the limited performance there often is the danger that the filter medium, which may be a piece of fabric, gets plugged in such a manner so that an effective cleaning action in regulary con intervals is necessary, the cleaning action being performed by fluid ejecting jets under high pressure acting on the filter medium. In addition, by this plugging action the cycles of filtration are shortened. During cleaning by the suction device, the filter medium, in the shape of a piece of fabric, is sucked on with the result that during the lifetime of the fabric it is stretched and worn by the suction head of the suction device.

From U.S. Pat. No. 5,139,670 a device for filtering and backwashing solid particles out of liquids is known, in which a filter drum is used, the dirty liquid is directed to flow from the inside to the outside of the filter drum. Disadvantageously, not the whole circumference of the cylindrical surface of the filter drum may be used at the same time. There is provided a backwashing device containing a spraying head of an ejection device located at the outside of the filter drum and above the liquid level. Thus, for cleaning purposes, it is possible to spray liquid jets to the filter medium of the filter drum, resulting in a removal of the filter cake at the inner surface of the filter drum, the filter cake being withdrawn by a hopper and a conduit connected to it and leading out of the filter drum. The resulting cleaning effect is good, because the sprayed fluid jets have to penetrate a room filled with air and show their action without decrease.

In EP 74 966 B1 a device for filtering solid particles out of a dirty liquid is described, especially sewage in a sewage treatment plant, in which no filter drum but rather flat filter plates coated with a filter medium are used. A backwash device comprising a spraying device with a spraying head on the one side of the filter medium and a suction device with a suction head on the other side of the filter medium is provided. The spraying head and the suction head are also located in contact with the filter plate or the filter medium resulting in a sealing action preventing the suction of the wrong liquid. It is a disadvantage of this device that the filter plates with the sealing elements make the device complicated and costly. Due to the contact between the filter plates and the filter medium with the spraying head and the suction head also, there is strong friction and wear of the filter plates and of the filter medium, which shortens their lifetime. The effect of the cleaning action is limited in principle, because the sprayed liquid jets have to penetrate a liquid cushion and are slowed rapidly prior to reaching the filter medium. When the cleaning capacity is overridden at such a device, then the filter medium is plugged more and more resulting in a raising of the liquid level. Disadvantageously, the difference in pressure increase results in a clamping action between the plugged filter medium and the elements of the cleaning device, namely the spraying head and the suction head, moved with respect to the filter plates. Thus the backwashing device cannot meet the expected functions.

SUMMARY OF THE INVENTION

It is the object of the invention to create a method and a device of the previously described manner, using the whole circumference of the filter drum for filtering purpose to provide an effective cleaning action of the filter medium by backwashing.

According to the invention this is achieved by a method of the described art, wherein at the beginning of each cycle of backwashing an air cushion is introduced in the filter drum, liquid in the filter drum is displaced so that liquid jets from an ejection apparatus containing a spraying head arranged in the interior of the filter drum, without being sealed on the filter drum, penetrate through the air cushion to the backside of the cylindrical surface of the filter drum and the filter cake, and the filter cake is removed by being withrawn at the outside of filter drum by a stream of liquid.

The invention starts with the idea of useing a filter drum located completely below the liquid level to have the whole circumference of the filter medium available for filtering purposes. At the beginning of each cycle of backwashing, which is started in intervals, an air cushion is introduced into the filter drum below the surface of the liquid level. This air cushion gets such a magnitude and expansion, that at least the outlets at the spraying head and the backside of the cylindrical surface of the filter drum, in the upper region of the filter drum, are surrounded by air making it possible that the liquid jets ejected by the spraying head can penetrate the air cushion without the braking effect of a liquid and hit the backside of the cylindrical surface of the filter drum, resulting in a strong cleaning effect with the same maximum intensity, which is reached with respect to filter drums which are located, for example partly below the liquid level and where the spraying device is located above the liquid level and works in the air. On the downstream surface of the filter drum and the filter medium the spraying head of the ejection apparatus acts in the air cushion, while on the upstream side of the filter drum suction acts in liquid. A stream or a flow of liquid is generated for the withdrawel of the removed filter cake. The liquid is used as a vehicle for the removed filter cake. This kind of operation, working downstream in air and upstream in liquid, occurs below the liquid level. The spraying head is located in the upper region of the filter drum, exactly where an air bubble gathers in the filter drum. The stream of liquid for the withdrawl of the filter cake is preferably located in the upper region outside the filter drum, opposite the spraying head. By the use of air on the one side and liquid on the other side, a direct contact between the filter drum and the elements of the backwashing device is prevented, which prevents wear. The filter drum and the filter medium may be constructed much easier, therefoe sealing elements, necessary in priciple in the prior art, are avoided. Surprisingly, the cleaning and backwashing effectiveness of the new method is so enormous, that even overloading of the cleaning capacity does not result in a rupture of working. To the contrary, a very thick filter cake may be efficiently removed by the new method because the liquid ejected during the cleaning cycle out of the nozzles toward the filter medium generates air bubbles, resulting in the filter cake floating to the surface.

For the withdrawl of the removed filter cake outside of the filter drum and the filter medium by a stream of liquid, a number of possibilities exist. Thus the removed filter cake may be withdrawn by a suction head located without sealing on the filter drum. The rim of the suction head must be positioned at a distance from the filter cake, however making it possible, that the wrong liquid will be succed out, but the necessary stream of liquid as a carrying vehicle is created. The air bubbles divided during a cleaning cycle will influence the suction apparatus making it necessary to also have a suction effect of surplus liquid. The momentum of the wrong liquid being succed out, helps to carry the removed filter cake with the liquid.

It is also possible to withdraw the removed filter cake without the use of a suction apparatus by using a flotation reservoir. For this purpose a flotation reservoir has to be connected to the upper region on the outside of the filter drum. The flotation reservoir is connected to the liquid by openings, resulting in the same liquid level around both the filter drum and in the flotation reservoir. The removed filter cake is conveyed by the liquid out of the nozzles through the air cushion onto the filter medium. The air bubbles generated at the same time favor the conveying action.

The air cushion may be generated during a backwashing cycle so that air bubbles from out of the air cushion penetrate the openings in the filter drum and the filter medium and escape in an upward direction. The permanent generation of an air cushion guarantees that there is always a spraying head surrounded by the air cushion during the whole cycle of backwashing, and thus the effectiveness of the cleaning action is maintained.

In the intervals in which there is no backwashing, the filter drum may be stopped from rotation. But during the backwashing cycle the filter drum is driven in intervals or continuously. During the cycle of backwashing the filtration is not interrupted, but continued. The cycle of backwashing may be controlled with respect to a maximum and a minimum liquid level above the filter drum.

A device adapted for carrying out the method is characterized by having an inlet conduit for air extending into the interior of the filter drum provided to generate an air cushion, and an ejection apparatus including a spraying head is positioned in the upper region of the interior of the filter drum, being positioned without sealing on the cylindrical surface of filter drum. The air cushion may also be introduced into the filter drum also by the spraying head of the ejection apparatus.

The spraying head with its oulets or nozzles ends at a spaced distance from the inner cylindrical surface of the filter drum, and extends along the length of the filter drum. However this region is filled with the air cushion during the backwashing cycle and is filled with liquid during filtering cycles.

Above the spraying head on the outside of the filter drum a suction head of a suction apparatus is located below the liquid level at a fixed distance with respect to the filter medium of filter drum, and is not sealed on the filter drum. The suction head of the suction apparatus is connected to a suction source which withdraws liquid and the removed filter cake carried therein, through the suction head and a connected conduit. The suction apparatus even with a thick layer of filter cake will not fail.

It is also possible that above the spraying head on the outside of filter drum there is a connection to a flotation reservoir, which contains a device for ejecting microbubbles. In this manner a stream is created within the flotation reservoir which results in the filter cake floating to the surface.

The flotation reservoir has an overflow and is connected with the liquid surrounding the filter drum. Thus the level of the liquid to be filtered and the liquid level of the flotation reservoir are always at the same height and vary between a maximum and a minimum value. The maximum value is predetermined in such a manner so that the overflow of the flotation reservoir is reached and passed, resulting in withdrawls of the floated solid particles in regular intervals from the surface of the flotation reservoir. The device for ejecting microbubbles may be equipped with an apparatus to expand air in solution in the liquid or with the use of a pair of electrodes.

The filter drum with its axis is supported horizontally on an outlet tube for the filtered liquid. The filter drum may rotate around the axis of the oulet tube. The filter drum is always located horizontally along its axis, thus creating an upper region to be filled with the air cushion during the backwashing cycle. The filter drum is supported rotationally to make it possible to raise the different regions of the filter drum during rotation for the purpose of backwashing.

The outlet tube extends into a filtration chamber, in which an overflow is located below the liquid level of the filter drum. Thus the difference in pressure necessary for filtration is generated and the liquid flows continuously through the filter medium.

BRIEF DESCRIPTION OF THE DRAWINGS

The invention herein is described with respect to preferred embodiments, illustrated in the following figures, which show in.

DETAILED DESCRIPTION

Figure 1:
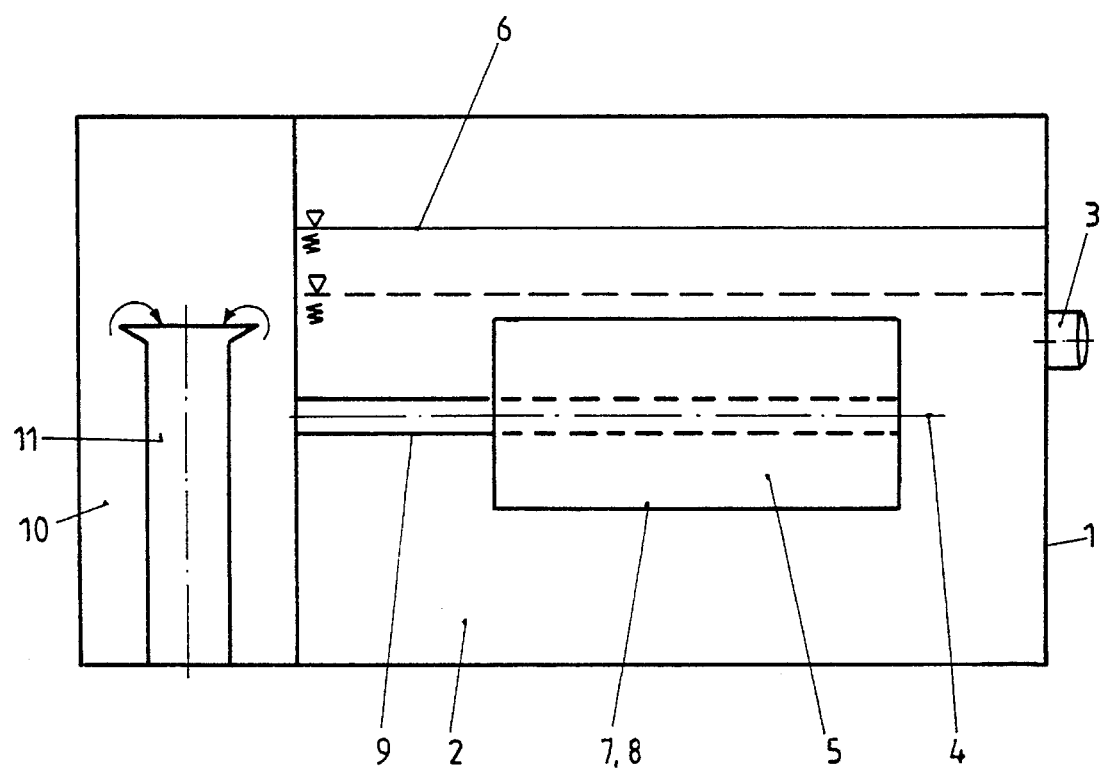
FIG. 1 a schematic side view of a device adapted to carry out the method.

In FIG. 1 there is illustrated a flume 1 in schematic manner, which could be a container also. In flume 1 there is provided a chamber 2 for the liquid to be filtered, entering the chamber by a conduit 3. Within chamber 2 is positioned a filter drum 5 having a horizontal axis 4. The filter drum 5 is arranged under the liquid level 6, shown in full line as a maximum level. In dotted lines there is illustrated a minimal liquid level during filtering process, liquid level 6 always being between these two lines. Even if the liquid level is minimal the filter drum 5 is completely under the liquid level and there is enough difference in pressure to keep the liquid flowing through the device. The filter drum 5 carries a filter medium 8 on a cylidrical surface 7. Filter drum 5 is shaped as an elongated cylinder, and may be constructed out of a perforated sheet of metal or out of wire nettings, carrying on its outside the filter medium 8, for example a product of needled felting, of metallic or plastic woven fabric, or foam plastic material. The front areas of the filter drum 5 are closed. An elongated oulet tube 9 passes through one of the front areas forming a bearing for the filter drum 5. This outlet tube inside the filter drum 5 is perforated making it possible that the liquid passes from the outside to the interior of filter drum 5 by flowing through the outlet tube 9. Outlet tube 9 ends in a filtration chamber 10, in which an overflow 11 is provided in the form of a tube so that the upper rim of the overflow 11 is situated below liquid level 6 in chamber 2, generating the necessary difference in pressure for the flow of liquid through the filter drum 5.

Figure 2:
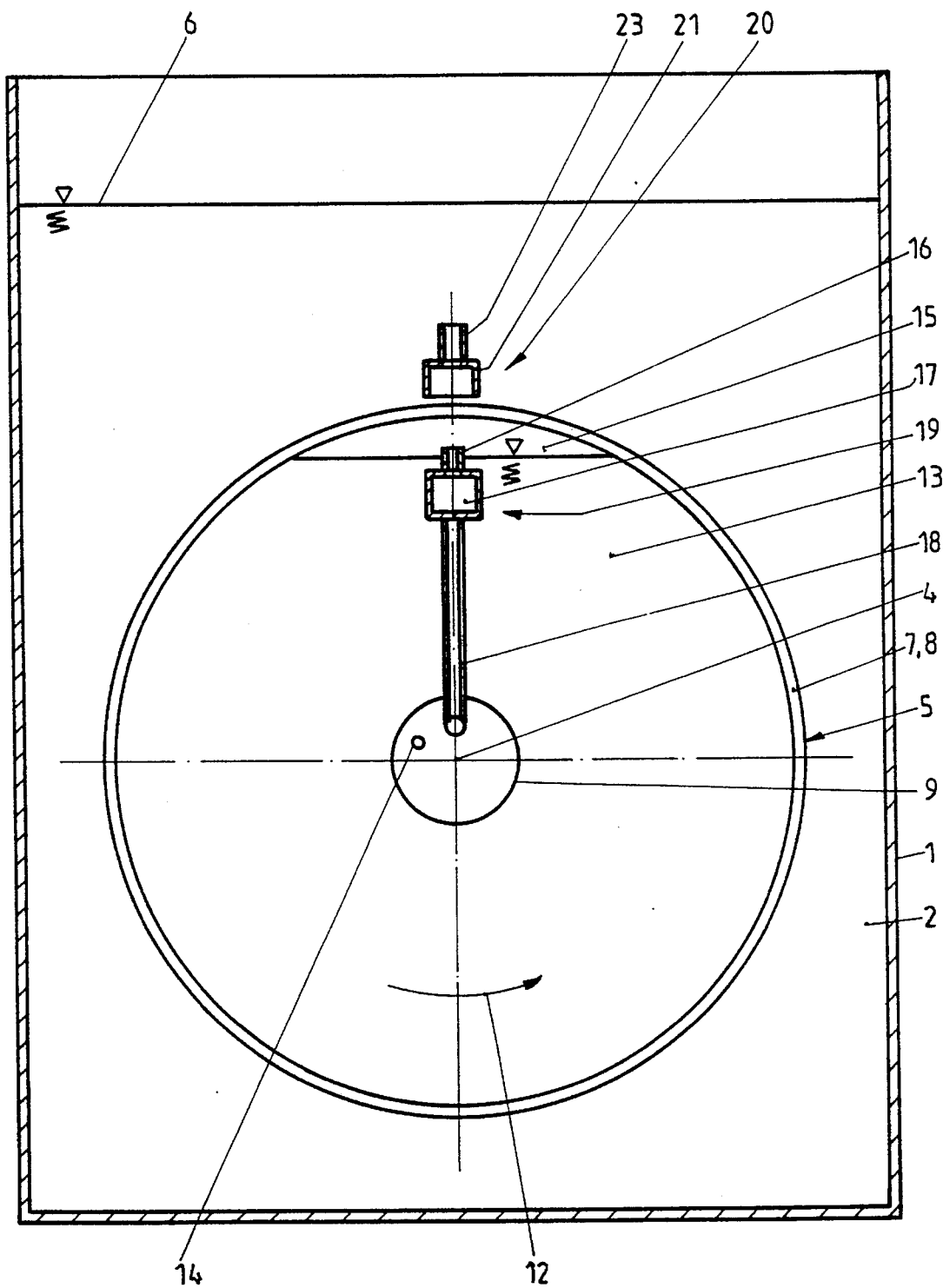
FIG. 2 a vertical section through the device.

FIG. 2 illustrates a schematic cross section perpendicular to the horizontal axis 4. The filter drum 5 with its cylindrical surface 7 and with the filter medium 8 is positioned below the liquid level 6. By a rotary drive, not shown, the filter drum 5 may be driven in intervals in the direction of or opposite to arrow 12, whereby in times, in which there is no backwashing, the filter drum preferably is not driven, however during the cycle of backwashing the filter drum 5 is driven continuously or in intervals in the direction of arrow 12. An inlet conduit 14 for air ends in the interior 13 of filter drum 5, the inlet conduit 14 elongating through outlet tube 9. It is the purpose of the inlet conduit 14 to create an air cushion 15 in the upper region of of the interior 13 of the filter drum 5 and to displace the liquid at this place. In the interior 13 of the filter drum 5 there is fixed a spraying head 17 having nozzles 16, the spraying head being connected to a conduit 18 for liquid under pressure, the conduit preferably elongating through the oulet tube 9 also. By a pump not shown the liquid in the conduit 18 under control of valves may be ejected out of the nozzles 16, whereby the liquid jets have to penetrate the air cushion 15 only and thus hit the inside of filter drum 5 or its cylindrical surface 7 and the filter medium 8 respectively under strong cleaning action in a manner to remove efficiently a filter cake from the outside of filter medium 8. The nozzles 16 on the spraying head 17 extend over the whole width or length of filter drum 5. The nozzles with the spraying head 17 and the conduit 18 are essential elements of an ejection apparatus 19. This ejection apparatus 19 including nozzles 16 is positioned at a spaced distance from the inner circumferential surface of the filter drum 5 thus preventing the danger of wear by contact. Due to this distance, the necessary effect with respect to the width of the filter drum is achieved by nozzles 16 being arranged in a row one behind the other.

A suction apparatus 20 is positioned with respect to the ejection apparatus 19. The suction apparatus contains a suction head 21 as an essential element, being fixed outside of filter drum 5 opposite to the ejection apparatus 19. The free rim of the suction head 21 is positioned at a distance to the filter drum 5 and the filter medium 8 thus preventing wear of suction head 21 and/or filter medium 8. It is especially important to create a flow of liquid illustrated by arrows 22 (FIG. 3) with this distance between filter drum 5 and suction head 21. This flow of liquid serves to convey the filter cake removed by the ejection apparatus 19. Of course the suction head 21 is connected to a conduit 23 leading to a suction reservoir, a pump for example, for the purpose of pulling off the liquid and the removed filter cake.

Figure 3:
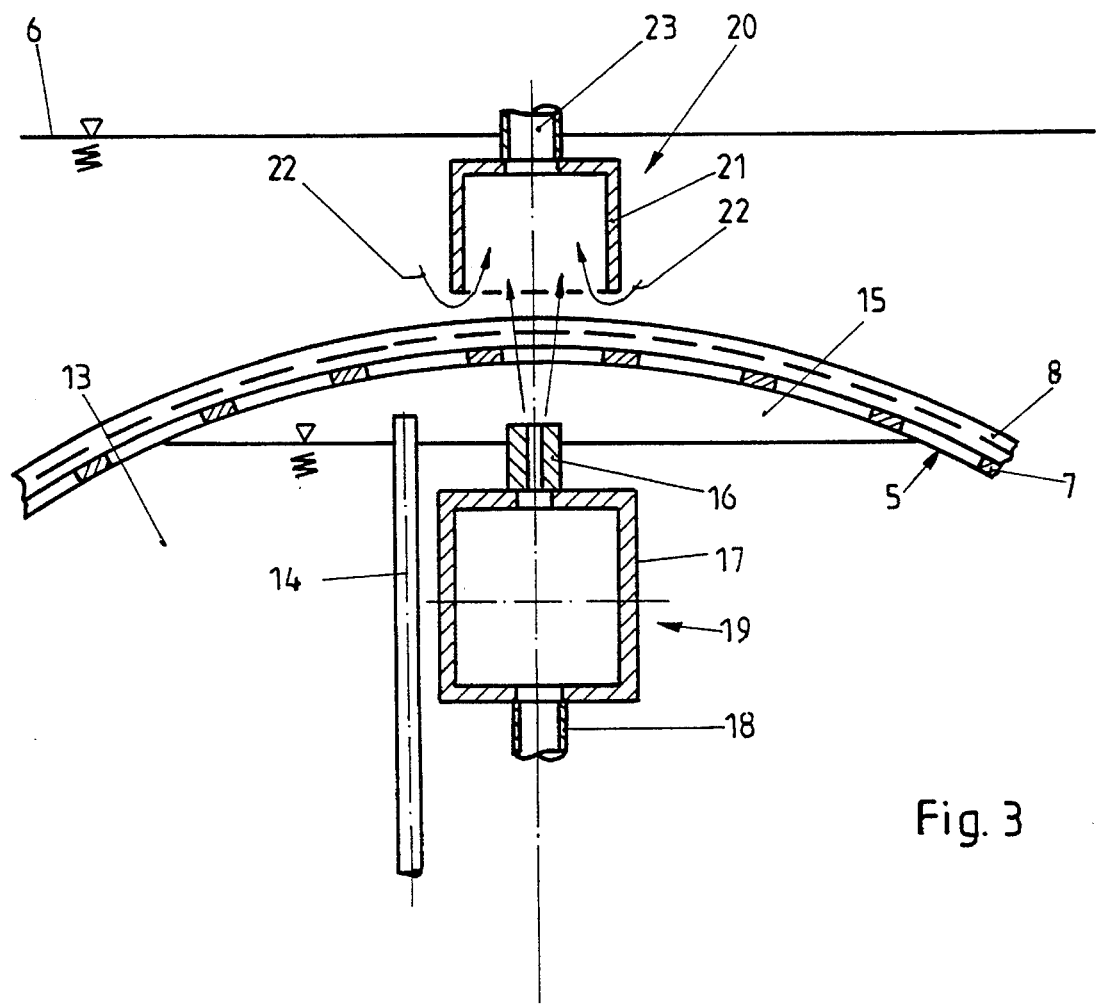
FIG. 3 the upper region of the filter drum in an enlarging scale.

FIG. 3 illustrates the upper region of filter drum 5 in an enlarged scale, filter drum 5 still being below liquid level 6. The inlet conduit 14 to create the air cushion 15 may also extend into the upper region of the interior of filter drum.

A cycle of backwashing may run as follows: Under continuous flow from the outside through filter drum 5 to the inside solid particles will be deposited on the outside of filter medium 8, thus the remaining cross section for the liquid to pass through will be decreased as time passes resulting in a raiseing of the liquid level 6 up to a predetermined maximum value. Even at this stage the flow through the filter drum is still directed from outside to the inside and filtered liquid flows over the overflow 11. Reaching the maximum liquid level 6 a cleaning cycle is started by creating air cushion 15 with the help of the inlet conduit 14 in such a manner that at least the nozzles 16 of ejection apparatus 19 are surrounded by the air cushion 15. Liquid under pressure from conduit 18 is now ejected by the nozzles 16 to the inner surface of cylindrical surface 7 and filter medium 8. The liquid jets only have to penetrate the air in the air cushion 15, the liquid jets are not involved in a braking action with respect to the momentum of the pressurized liquid. Thus the filter cake is removed efficiently from the outside of filter medium 8. The suction apparatus 20 is also started, resulting in a sucking action of liquid according to arrows 22 in of the space surrounding filter drum 5 by suction head 21 and conduit 23. This liquid transports the removed filter cake. During this cycle of cleaning filter drum 5 is driven continuously, or in intervals, whereby a full revolution of filter drum 5 may occur. It is also possible to continue the cycle of cleaning as long as a predetermined minimum liquid level is reached indicating that an effective cleaning has taken place and the backwashing operation can be finished.

Figure 4:
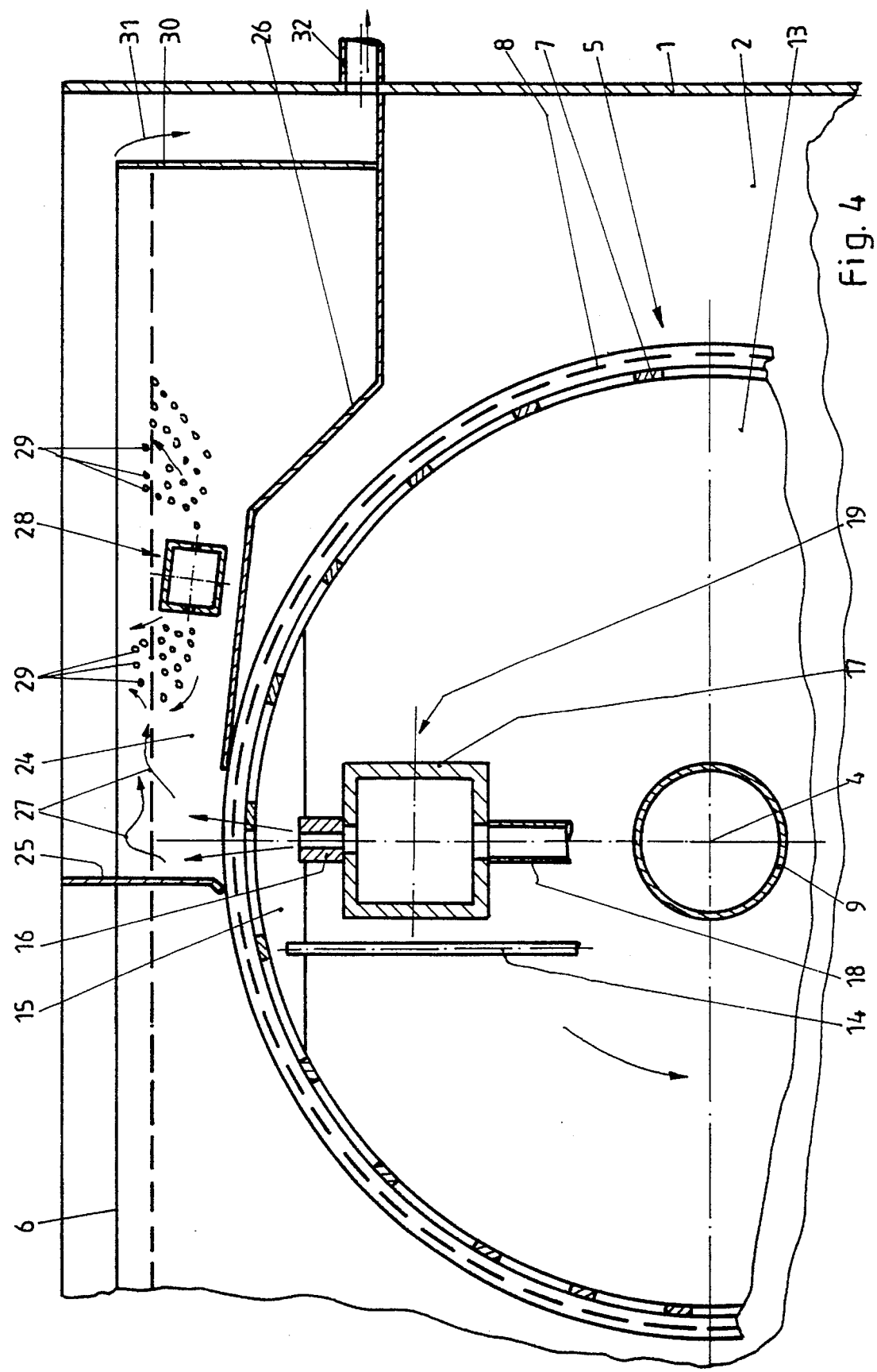
FIG. 4 a further embodiment of the device.

In FIG. 4 there is illustrated a further embodiment of the device. In the interior 13 of filter drum 5 there is the same arrangement of elements as in the embodiment of FIGS. 1 to 3. However the suction apparatus is replaced by a flotation reservoir 24 provided at the outside of filter drum 5 above the ejection apparatus 19. The flotation reservoir 24 is limited by guiding plates 25 and 26, but being connected to the liquid in chamber 2, especially in the upper region of the filter drum 5. Filter cake removed by the ejection apparatus 19 floats to the surface of the flotation reservoir 24 according to arrows 27 and is conveyed in this manner from the circumference of filter medium 8. Air bubbles from air cushion 15 penetrating the cylindrical surface 7 assist in this motion. In the flotation reservoir 24 there may be provided a device 28 to eject microbubbles 29 causing or favoring a stream of liquid in the flotation reservoir 24. The filter cake removed during one cycle of cleaning or backwashing thus will gather at the surface of flotation reservoir 24 and will rise together with rising liquid level 6. The flotation reservoir 24 contains an overflow 30, over which, in the direction of arrow 31, removed filter cake is withdrawn in intervals according to the cleaning cycles. This happens through a tube 32. The filter cake floated to the surface may be cleared by a raker also.

A cycle of backwashing will run here as well up to reaching maximum liquid level 6. At first filter cake from prior backwashing cycles will be withdrawn over overflow 30. The ejection apparatus 19 is started and the filter drum is rotated in intervals or continuously. Thus the filter medium 8 is cleaned, making it more penetrable for liquid, which results in a decrease of the liquid level in chamber 2 and in the flotation reservoir 24. This occurs until the minimum liquid level is reached, shown in FIG. 4 in dotted lines. The air cushion 15 generated at the beginning of a backwashing cycle may be used to favor and to intensify the floating of the removed filter cake to the surface. So it is necessary to either create a large air cushion 15 at the beginning of cleaning cycle, or to complete the air cushion during the cleaning cycle continuously so that the nozzles 16 always remain surrounded by the air cushion 15. By this cleaning action the liquid level 6 will be lowered. The cycle of backwashing is finished by the reaching of the predetermined minimum liquid level. While preferred embodiments of the invention have been disclosed and illustrated herein, it will be apparent those skilled in the art that variations and modifications thereof can be made without departing from the spirit and scope of the invention as set forth in the following claims.

LIST OF REFERENCE NUMERALS

1—flume
2—chamber
3—conduit
4—axis
5—filter drum
6—liquid level
7—cylindrical surface
8—filter medium
9—outlet tube
10—filtration chamber
11—overflow
12—arrow
13—interior
14—inlet conduit
15—air cushion
16—nozzle
17—spraying head
18—conduit
19—ejection apparatus
20—suction apparatus
21—suction head
22—arrow
23—conduit
24—flotation reservoir
25—guiding plate
26—guiding plate
27—arrow
28—device
29—microbubbles
30—overflow
31—arrow
32—tube

We claim:

1. A method for filtering and backwashing solid particles out of liquids, with a filter drum (5) positioned completely below a liquid level (6) having a cylindrical surface (7) coated with a filter medium (8), the liquid flowing through the outside of the filter drum to the inside, and a backwashing device for the removal of the filter cake from the filter medium, wherein at the beginning of each cycle of backwashing an air cushion (15) is introduced in the filter drum (5), liquid in the filter drum (5) is displaced so that liquid jets from an ejection apparatus (19) containing a spraying head (17) and being arranged in the interior of the filter drum without being sealed to the filter drum penetrate through the air cushion (15) to the backside of the cylindrical surface (7) of the filter drum (5), and the filter cake is removed by being withdrawn at the outside of filter drum (5) in a stream of liquid.

2. The method of claim 1, wherein the removed filter cake is withdrawn by a suction head (21) of a suction apparatus (20), the suction head (21) being spaced apart a distance from the filter drum.

3. The method of claim 1, wherein the removed filter cake is withdrawn in a flotation reservoir (24).

4. The method of claim 1, wherein the air cushion (15) is generated during a cycle of backwashing.

5. A device for carrying out the method of one of the claim 1, containing a driven filter drum (5) positioned completely below a liquid level (6) and having a cylindrical surface (7) coated with a filter medium (8), liquid flown from the outside of the filter drum to the inside of the filter drum, the filter drum having a backwashing device for removal of the filter cake from the filter medium (8), wherein an inlet conduit (14) for air provided to generate an air cushion (15) extends into the interior of the filter drum (5), and an ejection apparatus (19) including a spraying head (17) is fixed at a distance to the upper region of the interior of filter drum (5), without being sealed with respect to the cylindrical surface (7) of filter drum (5).

6. The device of claim 5, wherein a suction head (21) of a suction apparatus (20) is located below the liquid level (6) and above the spraying head (17) on the outside of filter drum (5), the suction head in position with respect to the filter medium (8) of filter drum (5).

7. The device of claim 5, wherein above the spraying head (17) on the outside of filter drum (5) there is a connection to a flotation reservoir (24), which contains a device (28) for ejecting microbubbles (29).

8. The device of claim 7, wherein the flotation reservoir (24) has an overflow (30) and is connected with the liquid surrounding the filter drum (5).

9. The device of claim 5, wherein the filter drum (5) with its axis (4) is supported horizontally on an outlet tube (9).

10. The device of claim 9, wherein the outlet tube (9) extends into a filtration chamber (10), in which an overflow (11) is located below the liquid level (6).

* * * * *